Jan. 4, 1944.                M. LIBBY ET AL                2,338,189
                    FILM MOUNT AND METHOD OF MOUNTING
                           Filed Feb. 8, 1941
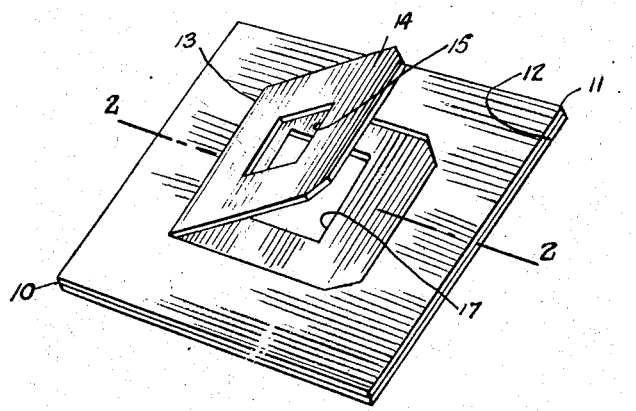
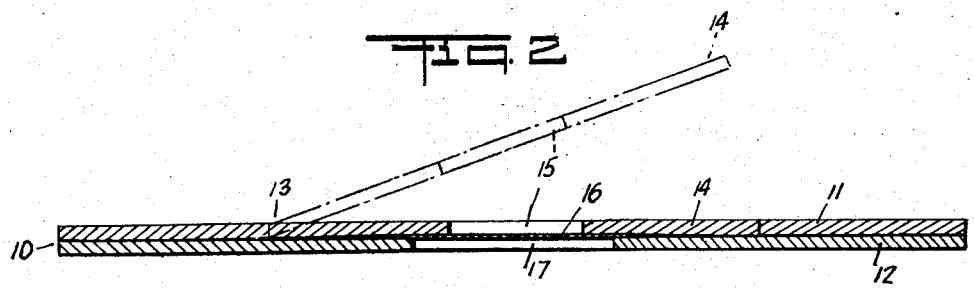
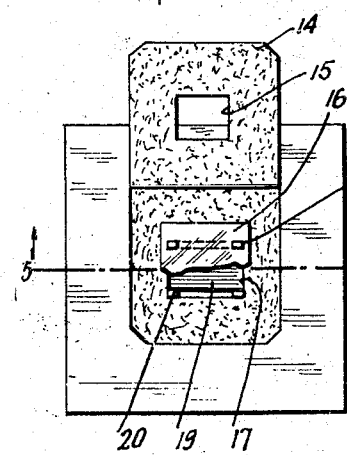
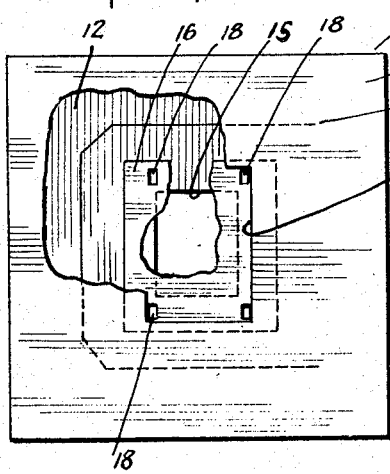
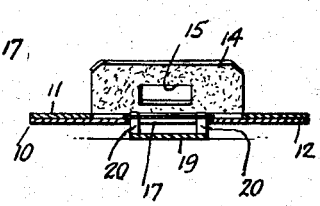
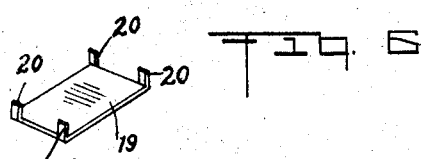
INVENTORS
Maurice Libby
and Herman Roth
BY S. Stephen Baker
ATTORNEY Patented Jan. 4, 1944

2,338,189

UNITED STATES PATENT OFFICE 2,338,189

FILM MOUNT AND METHOD OF MOUNTING

Maurice Libby and Herman Roth, Larchmont, N. Y.; said Roth assignor to said Libby Application February 8, 1941, Serial No. 378,109

3 Claims. (Cl. 154—2)

Our invention relates to photographic mounts and more particularly to mounts for transparencies of the type utilized by projecting machines.

While our invention is applicable to various sizes and types of transparencies, it is particularly directed toward the 16 mm. photographic film and the means of mounting such film for projection purposes.

One of the objects of our invention is to insure the most accurate centering of the film in the mount opening, the advantages accruing therefrom being apparent.

Another object of our invention is to mount small film such as the 16 mm. size, in mounts having overall dimensions identical with those of the larger 35 mm. size.

Another object of our invention is to utilize the usual marginal perforations on the film frame to center the film in the mount.

Other objects of our invention will be apparent from the following description, it being understood that the above general statements of the objects of our invention are intended to explain and not to limit it in any manner.

In the drawing,

Fig. 1 is a top perspective view of a photographic mount before the insertion of a film frame therein;

Fig. 2 is a sectional view taken, for example, along the line 2—2 of Fig. 1, illustrating the action of the flap and the securing of a film frame;

Fig. 3 is a rear view of the assembled mount and film frame, partly broken away;

Fig. 4 is a plan view of the mount with the film frame therein, prior to sealing the same;

Fig. 5 is a section along the line 5—5 of Fig. 4;

Fig. 6 illustrates the lug device for positioning the film frame within the mount.

The mount is formed of a single sheet of cardboard or the like, knife-scored along the line 10 to form upper and lower sections 11 and 12. Score line 13 forms the hinge for a flap 14 cut from the section 11. Save for the flap 14, the sections 11 and 12 are connected by adhesive to form a laminated article of two ply construction as shown in Fig. 2. These sections 11 and 12 may be jointly designated as a frame member for receiving the film as will be hereinafter described.

The flap 14 has an opening 15 formed therein which opening conforms exactly in dimensions to the portion of the film 16 to be projected.

Section 12 has a larger opening 17 formed therein, said opening conforming exactly in dimensions to the portion of the film 16 which includes the portion of the film 16 to be projected plus the usual marginal perforations 18 of said film. In the usual 16 mm. film, there are four such perforations 18 each disposed at the corners of the film frame.

The underside of the flap 14 is provided with adhesive and the area of the upper surface of section 12 not covered by the section 11 is likewise provided with adhesive so that when the flap 14 is pressed down to enclose a film frame 16 in the mount, the flap 14 adheres to said upper surface of section 12 and forms a neat structure with no movable parts.

The adhesive to be used may be ordinary rubber cement or a solution of para rubber in gasoline is advantageously employed, this solution having the property of adhering only to a similar surface upon mere contact therewith.

Our invention is practiced in the following manner:

An aligning member 19, having four pins 20, is so disposed in relation to the mount that the opening 17 frictionally embraces the pins 20 snugly, each pin 20 occupying a corner of said opening 17. It is obvious therefore that the pins 20 are spaced according to the four marginal perforations of each 16 mm. film frame. In actual practice the member 19 is preferably of metal and may be maintained on a yieldable support, the mount fitting on the pins 20 as aforesaid.

The film 16 comprises part of a length of film, which part has been selected for mounting purposes. This part not only consists of the particular film frame desired but is cut so as to include half of both the preceding and following film frames on either side of the desired frame. These half frames form margins for the desired frame so that mounting is facilitated.

When the mount has been deposited over the pins 20 in the manner above stated, the film 16 is set by placing it over the aligning member 19, the pins 20 entering the four marginal perforations of the film. This may be accomplished either manually or mechanically as disclosed in our Patent 2,302,561 granted November 17, 1942. In this manner, the film 16 is exactly centered and retained temporarily thus by the pins 20.

At this point the flap 14 is pressed down to cause it to adhere to the upper surface of section 12 and this action is accompanied by the ejection of the pins 20 from the opening 17 due to the descent of the flap 14. As hereinbefore stated, the member 19 may rest on a yieldable support, and this support yields in response to the pressure on the flap 14. However, neither a yieldable support nor any support at all is necessary since all that is required is that the member 19 be ejected.

Since the member 19 only leaves the perforations 18 when the flap 14 is sealed, the film 16 has no opportunity to become displaced from its centered position. This insures the production of an excellent mount. Furthermore, the integrity of the flap 14 and section 11 permits only the correct sealing thereof with the minimum of care and attention.

Inasmuch as in the usual 16 mm. film the picture per se is located substantially within the area defined by the perforations 18, the smaller opening 15 permits the projections of only that desired part of the film and the perforations 18 are screened thereby. The half frame margins permit the retention of the film 16 within the mount.

We have shown a preferred embodiment of our invention but it is obvious that numerous changes and omissions may be made without departing from its spirit.

We claim:

1. The method of mounting film having perforations therein on a mount composed of two sections, adapted to be placed with one section superimposed on the other, one of said sections having an opening therein for receiving said film and the other of said sections having a smaller opening of an area equal to that of the portion of the film to be exposed to view, which method comprises inserting a removable aligning member through the said larger opening, disposing the film with the perforations therein registering with said aligning member so that said film is properly positioned relative to said larger opening and said mount, and then placing on said film the other section having the said smaller opening to securely retain said film between said sections.

2. The method of mounting film having perforations therein in a mount having two sections, one of which is adapted to be folded over the other, one of said sections having an opening therein of an area larger than that of the portion of the film to be exposed to view and the other of said sections having an opening therein of an area equal to that of the portion of the film to be exposed to view, which method comprises inserting a member having aligning prongs through the aforesaid larger opening, placing the film with the perforations therein registering with the said prongs and with the marginal portions thereof resting on the portions of said section defining said larger opening, folding said other section to engage the first mentioned section, bonding the two sections together so as to securely hold the film therebetween with the portion thereof it is desired to expose to view registering with the said smaller opening, and removing the aligning prong member from the resulting film mount.

3. A process as defined in claim 2, in which process a portion of the section containing the smaller opening is moved into contact with said prongs, and upon continued movement of said portion into engagement with the section containing the larger opening the pronged member is removed from the film mount.

MAURICE LIBBY.
HERMAN ROTH.